(12) United States Patent
Liu

(10) Patent No.: US 11,589,308 B2
(45) Date of Patent: Feb. 21, 2023

(54) METHOD AND DEVICE FOR TRANSMITTING WAKE-UP SIGNAL, AND METHOD AND DEVICE FOR PAGING DEMODULATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 176 days.

(21) Appl. No.: 17/055,924

(22) PCT Filed: May 21, 2018

(86) PCT No.: PCT/CN2018/087646
§ 371 (c)(1),
(2) Date: Nov. 16, 2020

(87) PCT Pub. No.: WO2019/222877
PCT Pub. Date: Nov. 28, 2019

(65) Prior Publication Data
US 2021/0227467 A1    Jul. 22, 2021

(51) Int. Cl.
*H04W 52/02* (2009.01)
*H04W 56/00* (2009.01)
*H04W 68/00* (2009.01)
*H04W 72/04* (2009.01)
*H04W 72/0446* (2023.01)
*H04W 72/0453* (2023.01)

(52) U.S. Cl.
CPC ..... *H04W 52/0229* (2013.01); *H04W 56/001* (2013.01); *H04W 68/005* (2013.01); *H04W 72/042* (2013.01); *H04W 72/0446* (2013.01); *H04W 72/0453* (2013.01)

(58) Field of Classification Search
CPC ......... H04W 52/0229; H04W 72/0446; H04W 72/0453; H04W 52/0235; H04W 72/042; H04W 68/005; H04W 56/001
USPC ....................................................... 370/329
See application file for complete search history.

(56) References Cited

U.S. PATENT DOCUMENTS 9,525,540 B1 * 12/2016 Shellhammer ........ H04L 7/0012
10,880,834 B2 * 12/2020 Liu .................. H04W 52/0235
(Continued)

FOREIGN PATENT DOCUMENTS

CN    107820721 A    3/2018

OTHER PUBLICATIONS

R1-1802865 (Year: 2018).*
(Continued)

*Primary Examiner* — Intekhaab A Siddiquee
(74) *Attorney, Agent, or Firm* — Syncoda LLC; Feng Ma

(57) ABSTRACT

A method for transmitting a wake-up signal includes: if it is determined that the wake-up signal needs to be transmitted within a current synchronous broadcast block (SSB) period, configuring a time-frequency position for the wake-up signal, a frequency-domain position of the wake-up signal being frequency-division multiplexed with the current SSB, and a time domain position of the wake-up signal being located within a time domain symbol range of the current SSB; transmitting the time-frequency position of the wake-up signal to the UE; and sending the wake-up signal at the time-frequency position.

20 Claims, 7 Drawing Sheets

(56) References Cited

U.S. PATENT DOCUMENTS

2003/0002539 A1     1/2003   Soda et al.
2010/0208640 A1     8/2010   Cheng et al.
2016/0374022 A1*   12/2016   Ang .................. H04W 52/0216

OTHER PUBLICATIONS 62559331P (Year: 2017).*
62673718P (Year: 2018).*
State Intellectual Property Office of the People's Republic of China, Office Action and Search Report Issued in Application No. 201880000688X, dated Aug. 12, 2019, 14 pages, (Submitted with Machine Translation).
State Intellectual Property Office of the People's Republic of China, Office Action and Search Report Issued in Application No. 201880000688X, dated Mar. 27, 2020, 15 pages, (Submitted with Machine Translation).
ISA State Intellectual Property Office of the People's Republic of China, International Search Report Issued in Application No. PCT/CN2018/087646, dated Feb. 25, 2019, WIPO, 4 pages.
European Patent Office, Extended European Search Report Issued in Application No. 18920098.3, dated May 18, 2021, Germany, 10 pages.
ISA State Intellectual Property Office of the People's Republic of China, Written Opinion of the International Searching Authority Issued in Application No. PCT/CN2018/087646, dated Feb. 25, 2019, WIPO, 9 pages.
Qualcomm Incorporated, "DL signals and channels for NR-U", 3GPP TSG RAN WG1 Meeting #93, Busan, Korea, R1-1807387, May 21-May 25, 2018, 10 pages.
Motorola Mobility, Lenovo, "Feature lead summary for NR-U DL Signals and Channels", 3GPP TSG RAN WG1 Meeting 94, Gothenburg, Sweden, R1-1809791, Aug. 20-24, 2018, 12 pages.
Qualcomm Incorporated, "Potential solutions and techniques for NR unlicensed", 3GPP TSG RAN WG1 Meeting #92, Athens, Greece, R1-1802865, Feb. 26-Mar. 2, 2018, 11 pages.

* cited by examiner

METHOD AND DEVICE FOR TRANSMITTING WAKE-UP SIGNAL, AND METHOD AND DEVICE FOR PAGING DEMODULATION

CROSS-REFERENCE TO RELATED APPLICATION

This application is a national stage of International Application No. PCT/CN2018/087646 filed on May 21, 2018, the disclosure of which is hereby incorporated by reference in its entirety.

TECHNICAL FIELD

Embodiments of the present disclosure relate to the field of communication technology, and more particularly to methods and devices for transmitting wake-up signal, methods and devices for demodulating paging, a base station, user equipment, and a computer-readable storage medium.

BACKGROUND

With the rapid development of wireless communication technology, the fifth generation of mobile communication technology (5G) has emerged. The Third Generation Partnership Project (3rd Generation Partnership Project, 3GPP) has launched recently a study on the 5G New Radio Unlicensed Spectrum (NR-U). Most believe that NR-U can stand alone and the design of 5G New Radio (NR) should be inherited to the NR-U as much as possible. In the design of unlicensed spectrum, things to be considered at first involve relevant laws and regulations in various regions over the world, for example, listen before talk (LBT) and occupied channel bandwidth (OCB). The meaning of LBT is that, before transmitting a signal through a channel, energy detection must be performed on the channel and in a case that other equipment is transmitting a signal through the channel, the signal must should not be transmitted until waiting according to some strategy.

In 5G NR, it is required to study a scenario in which unlicensed spectrum cells stand alone. For this new scenario, the base station may fail to transmit a Synchronization Signal Block (SSB) or a paging message in a case of detecting that a channel is occupied.

In addition, as the power consumption caused by traditional paging transmitting and receiving technology is relatively high, it is necessary to introduce a wake-up signal to save power for terminals. The wake-up signal is usually transmitted in form of sequence before a paging occasion (PO), which helps user equipment (UE) to detect a signal and thereby reduces power consumption. Meanwhile, as the wake-up signal is transmitted in form of sequence, it can produce an effect similar to that of the synchronization signal, which is beneficial to solve the problem that an SSB is blocked in the NR-U.

However, if a wake-up signal is introduced into the NR-U, it needs to meet the requirements of LBT or OCB. If the wake-up signal is transmitted separately, it will occupy a lot of resources, especially in the case of more beams.

Introducing the wake-up signal into the Narrow Band Internet of Things (NB-IoT) system mainly concerns the relationship between the wake-up signal and the paging occasion, and the grouping problem, while LBT is not necessary. However, for multiple-beam NR-U systems, LBT is required and LBT will cause problems such as paging loss. Further, in view of OCB, transmitting a wake-up signal separately leads to a waste of resources.

SUMMARY

In view of this, this disclosure discloses methods and devices for transmitting wake-up signal, methods and devices for demodulating paging, a base station, user equipment, and a computer-readable storage medium to solve the problem of paging loss caused by LBT, and the power consumption of the UE due to frequently demodulating paging messages on the PDCCH can also be reduced.

According to a first aspect of the embodiments of the present disclosure, there is provided a method of transmitting a wake-up signal, applicable to a base station, and the method includes:

configuring, in a case that the wake-up signal is to be transmitted in a period of a current synchronization signal block SSB, a time-frequency position for the wake-up signal, so that a frequency-domain position for the wake-up signal is frequency division multiplexed with the current SSB, and a time-domain position for the wake-up signal is located in a time domain symbol range of the current SSB;

transmitting, to user equipment (UE), the time-frequency position for the wake-up signal; and transmitting the wake-up signal at the time-frequency position.

In an embodiment of the present disclosure, transmitting the wake-up signal at the time-frequency position includes:

performing, before transmitting the wake-up through a channel wherein the time-frequency position is located, energy detection on the channel for a preset time interval; and transmitting, in a case that energy of the channel is no more than a preset threshold, the wake-up signal at the time-frequency position.

In an embodiment of the present disclosure, the method further includes:

Transmitting, in a case that the energy of the channel is greater than the preset threshold, the wake-up signal at a pre-configured alternative position.

In an embodiment of the present disclosure, the method further includes:

configuring the alternative position for the wake-up signal; and transmitting, to the UE, the alternative position for the wake-up signal.

According to a second aspect of the embodiments of the present disclosure, a method of demodulating paging is provided, which is applicable to user equipment (UE), and the method includes:

receiving, from a base station, a time-frequency position for a wake-up signal, wherein a frequency-domain position for the wake-up signal is frequency division multiplexed with a current SSB, and a time-domain position for the wake-up signal is located in a time-domain symbol range of the current SSB;

detecting the wake-up signal at the time-frequency position; and demodulating, in a case that the wake-up signal is detected, a paging message to the UE on a physical downlink control channel (PDCCH).

In an embodiment of the present disclosure, the method further includes:

detecting, in a case that the wake-up signal is not detected at the time-frequency position, the wake-up signal at an alternative position for the wake-up signal.

In an embodiment of the present disclosure, the method further includes:

receiving, from the base station, the alternative position for the wake-up signal.

In an embodiment of the present disclosure, the method further includes:

taking, in a case that other information which is carried by other channels multiplexed with the current SSB is demodulated at a time-frequency position within a preset range from the time-frequency position, the wake-up signal as a reference signal for demodulating the other information.

According to a third aspect of the embodiments of the present disclosure, there is provided a device for transmitting a wake-up signal, which is applicable to a base station, and the device includes:

a first configuration module, configured to configure, in a case that a wake-up signal is to be transmitted in a period of a current synchronization signal block SSB, a time-frequency position for a wake-up signal, so that a frequency-domain position for the wake-up signal is frequency division multiplexed with the current SSB, and a time-domain position for the wake-up signal is located in a time domain symbol range of the current SSB;

a first transmitting module, configured to transmit, to user equipment (UE), the time-frequency position for the wake-up signal configured by the first configuration module; and a second transmitting module, configured to transmit, at the time-frequency position configured by the first configuration module, the wake-up signal.

In an embodiment of the present disclosure, the second transmitting module includes:

an energy detecting sub-module, configured to perform, before transmitting the wake-up signal through a channel where the time-frequency position is located, energy detection on the channel for a preset time interval; and a first transmitting sub-module, configured to transmit, in a case that energy of the channel detected by the energy detection sub-module is no more than a preset threshold, the wake-up signal at the time-frequency position.

In an embodiment of the present disclosure, the device further includes:

a third transmitting module, configured to transmit, at a pre-configured alternative position, the wake-up signal in a case that the energy of the channel detected by the energy detecting sub-module is greater than the preset threshold.

In an embodiment of the present disclosure, the device further includes:

a second configuration module, configured to configure the alternative position for the wake-up signal; and a fourth transmitting module, configured to transmit, to the UE, the alternative position for the wake-up signal configured by the second configuration module.

According to a fourth aspect of the embodiments of the present disclosure, there is provided a device for demodulating paging, which is applicable to user equipment (UE), and the device includes:

a first receiving module, configured to receive, from a base station, a time-frequency position for a wake-up signal, wherein a frequency-domain position for the wake-up signal is frequency division multiplexed with a current SSB, and a time-domain position for the wake-up signal is located in a time-domain symbol range of the current SSB;

a first detecting module, configured to detect, at the time-frequency position received by the first receiving module, the wake-up signal;

a demodulating module, configured to demodulate, in a case that the first detecting module detects the wake-up signal, a paging message to the UE on a physical downlink control channel (PDCCH).

In an embodiment of the present disclosure, the device further includes:

a second detecting module, configured to detect, in a case that the first detecting module fails to detect the wake-up signal at the time-frequency position, the wake-up signal at an alternative position for the wake-up signal.

In an embodiment of the present disclosure, the device further includes:

a second receiving module, configured to receive, from the base station, the alternative position for the wake-up signal.

In an embodiment of the present disclosure, the device further includes:

a demodulation reference module, configured to take, in a case that other information which is carried by other channels multiplexed with the current SSB is demodulated at a time-frequency position within a preset distance range from the time-frequency position received by the first receiving module, the wake-up signal as a reference signal for demodulating the other information.

According to a fifth aspect of the embodiments of the present disclosure, there is provided a base station, including:

a processor; and memory, configured to store instructions executable by the processor;

wherein, the processor is configured to:

configure, in a case that a wake-up signal is to be transmitted in a period of a current synchronization signal block SSB, a time-frequency position for a wake-up signal, so that a frequency-domain position for the wake-up signal is frequency division multiplexed with the current SSB, and a time-domain position for the wake-up signal is located in a time domain symbol range of the current SSB;

transmit, to user equipment (UE), the time-frequency position for the wake-up signal; and transmit, at the time-frequency position, the wake-up signal.

According to a sixth aspect of the embodiments of the present disclosure, there is provided user equipment, including:

a processor; and memory, configured to store instructions executable by the processor;

wherein, the processor is configured to:

receive, from a base station, a time-frequency position for the wake-up signal, wherein a frequency-domain position for the wake-up signal is frequency division multiplexed with a current SSB, and a time-domain position for the wake-up signal is located in a time-domain symbol range of the current SSB;

detect, at the time-frequency position, the wake-up signal; and demodulate, in a case that the wake-up signal is detected, a paging message to UE on a physical downlink control channel (PDCCH).

According to a seventh aspect of the embodiments of the present disclosure, there is provided a computer-readable storage medium having computer instructions stored thereon, which, in a case that the computer instructions executed by a processor, implement steps of the above method of transmitting wake-up signal.

According to an eighth aspect of the embodiments of the present disclosure, there is provided a computer-readable storage medium having computer instructions stored thereon, which, in a case that the computer instructions executed by a processor, implement steps of the above method of demodulating paging.

The technical solutions provided by the embodiments of the present disclosure may include the following beneficial effects:

In a case that a wake-up signal is to be transmitted in a period of the current synchronization signal block (SSB), the time-frequency position for the wake-up signal is configured, and the time-frequency position for the wake-up signal is transmitted to the UE, and the wake-up signal is transmitted at the time-frequency position, thereby enhancing transmission efficiency of the wake-up signal and effectively solving the problem of paging loss caused by LBT.

Through detecting the wake-up signal at the received time-frequency position for the wake-up signal, in a case that the wake-up signal is detected, demodulating the paging message to the UE on the PDCCH, embodiments according to the present disclose may effectively reduce the power consumption due to frequently demodulating paging messages on the PDCCH.

It should be understood that the above general description and the following detailed description are only exemplary and explanatory, and cannot be construed as a limit to the present disclosure.

BRIEF DESCRIPTION OF THE DRAWINGS

The drawings herein are incorporated into the disclosure and constitute a part of the disclosure, illustrate embodiments in accordance with the present disclosure, and serve to explain the principle of the present disclosure together with the specification.

DETAILED DESCRIPTION

Herein, exemplary embodiments will be described in detail, and examples thereof are illustrated in the accompanying drawings. In case that the following description relates to the drawings, unless otherwise indicated, the same reference signs in different drawings indicate the same or similar elements. The implementation manners described in the following exemplary embodiments do not represent all implementation manners consistent with the present invention. Rather, they are merely examples of devices and methods consistent with some aspects of the present invention as detailed in the appended claims.

Figure 1:
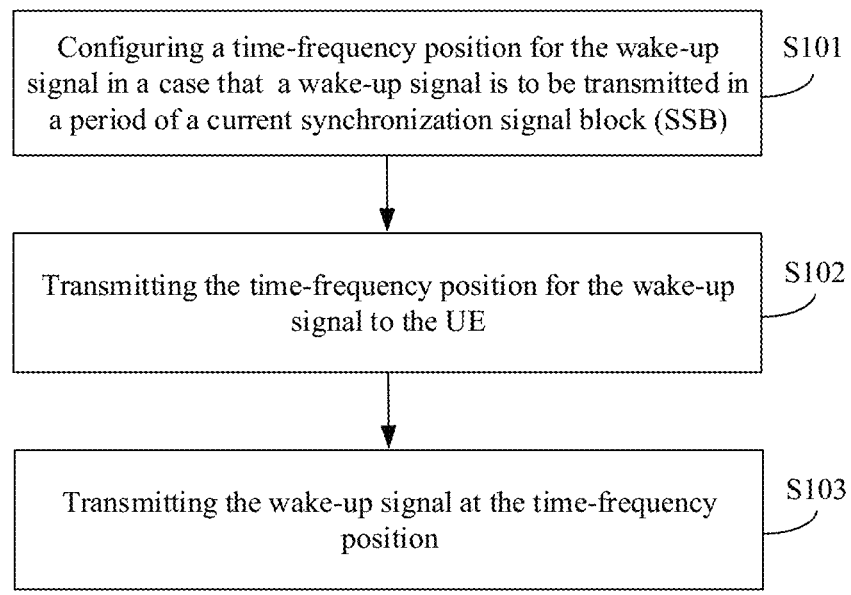
FIG. 1 is a flowchart of a method of transmitting a wake-up signal according to an exemplary embodiment of the present disclosure.

FIG. 1 is a flow chart of a method of transmitting wake-up signal according to an exemplary embodiment of the present disclosure. This embodiment is described at the base station side. As illustrated in FIG. 1, the method of transmitting wake-up signal includes:

In step S101, in a case that a wake-up signal is to be transmitted in a period of a current synchronization signal block (SSB), a time-frequency position is configured for the wake-up signal, so that a frequency-domain position for the wake-up signal is frequency division multiplexed with the current SSB, and a time-domain position is located in a time domain symbol range of the current SSB.

The SSB refers to a synchronization signal block (Synchronization Signal Block) or a physical broadcast channel block (PBCH Block).

Figure 2:
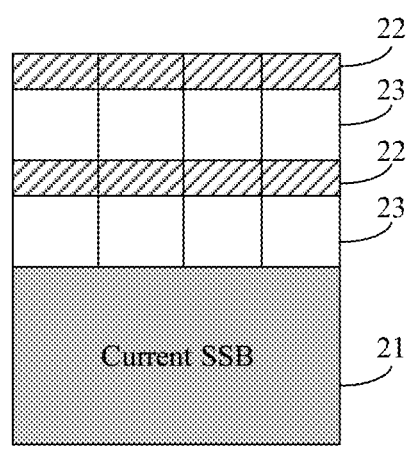
FIG. 2 is a schematic diagram illustrating a wake-up signal frequency division multiplexed with an SSB according to an exemplary embodiment of the present disclosure.

In this embodiment, as illustrated in FIG. 2, the current SSB 21 can be frequency division multiplexed with the wake-up signal 22, or can be frequency division multiplexed with the wake-up signal 22 and other channels 23.

Since the time-domain position for the wake-up signal is located in the time-domain symbol range of the current SSB, a quantity of time-domain symbols of the wake-up signal is less than or equal to a quantity of time-domain symbols of the current SSB. In addition, optionally, some SSBs may not be multiplexed with the wake-up signal.

In step S102, the time-frequency position for the wake-up signal is transmitted to the UE.

In step S103, the wake-up signal is transmitted at the time-frequency position.

In this embodiment, energy detection can be performed, before transmitting the wake-up signal through a channel where the time-frequency position is located, on the channel for a preset time interval, and the wake-up signal is transmitted, in a case that the energy of the channel is less than a preset threshold, at the time-frequency position. In a case that the energy of the channel is greater than the preset threshold, the wake-up signal is transmitted at a pre-configured alternative position. The preset time interval is determined by an LBT algorithm.

In order to be able to transmit the wake-up signal at the alternative position, the method may further include: configuring an alternative position for the wake-up signal, and transmitting the alternative position for the wake-up signal to the UE.

In the above embodiment, in a case that the wake-up signal is to be transmitted in the period of the current synchronization signal block (SSB), the time-frequency position is configured for the wake-up signal, and the time-frequency position for the wake-up signal is transmitted to the UE, and the wake-up signal is transmitted at the time-frequency position, thereby enhancing the transmission efficiency of the wake-up signal and effectively solving the problem of paging loss caused by LBT.

Figure 3:
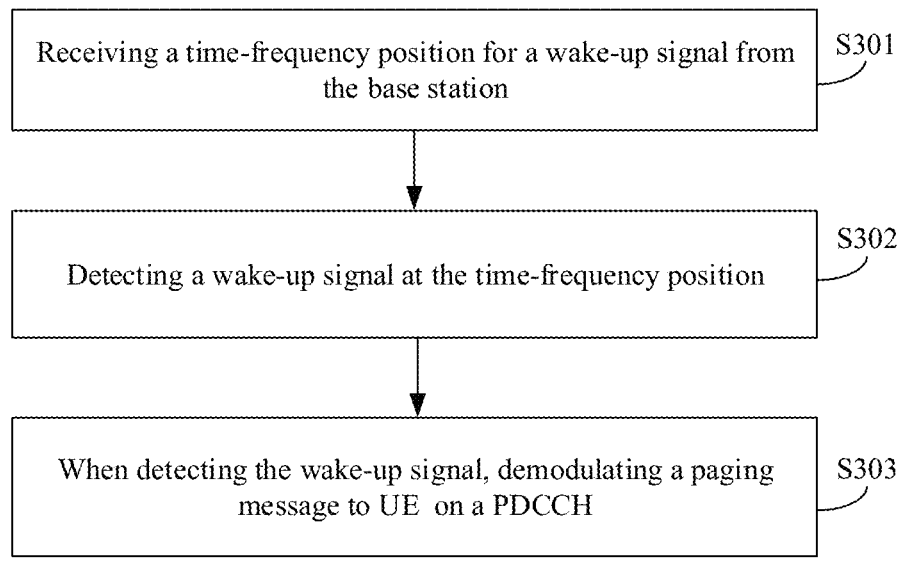
FIG. 3 is a flowchart of a method of demodulating paging according to an exemplary embodiment of the present disclosure.

FIG. 3 is a flowchart of a method of demodulating paging according to an exemplary embodiment of the present disclosure. This embodiment is described at the UE side. As illustrated in FIG. 3, the method includes:

In step S301, a time-frequency position for a wake-up signal is received from the base station, wherein a frequency-domain position for the wake-up signal is frequency division multiplexed with the current SSB, and a time-domain position for the wake-up signal is located in a time-domain symbol range of the current SSB.

In step S302, a wake-up signal is detected at the time-frequency position.

In step S303, in a case that the wake-up signal is detected, a paging message to UE is demodulated on a physical downlink control channel (PDCCH).

In this embodiment, in a case that the wake-up signal is not detected at the above-mentioned time-frequency position, the wake-up signal can be detected at an alternative position for the wake-up signal.

In order to detect the wake-up signal at the alternative position for the wake-up signal, the method may further include: receiving, from the base station, the alternative position for the wake-up signal.

In this embodiment, until that the wake-up signal is detected, the paging message is not demodulated on the PDCCH so as to save power.

In addition, optionally, since the current SSB may be multiplexed with other channels, in a case that it is multiplexed with other channels, the wake-up signal can be taken as a reference signal to demodulate other multiplexed channels. That is, the wake-up signal can be used as a reference signal in a case that other information which is carried by other channels multiplexed with the current SSB is demodulated at a time-frequency position within a preset distance range from the time-frequency position.

In the above embodiment, the wake-up signal is detected at the received time-frequency position for the wake-up signal, and in a case that the wake-up signal is detected, the paging message to the UE is demodulated on the PDCCH, thereby reducing power consumption due to frequently demodulating paging messages on the PDCCH.

Figure 4:
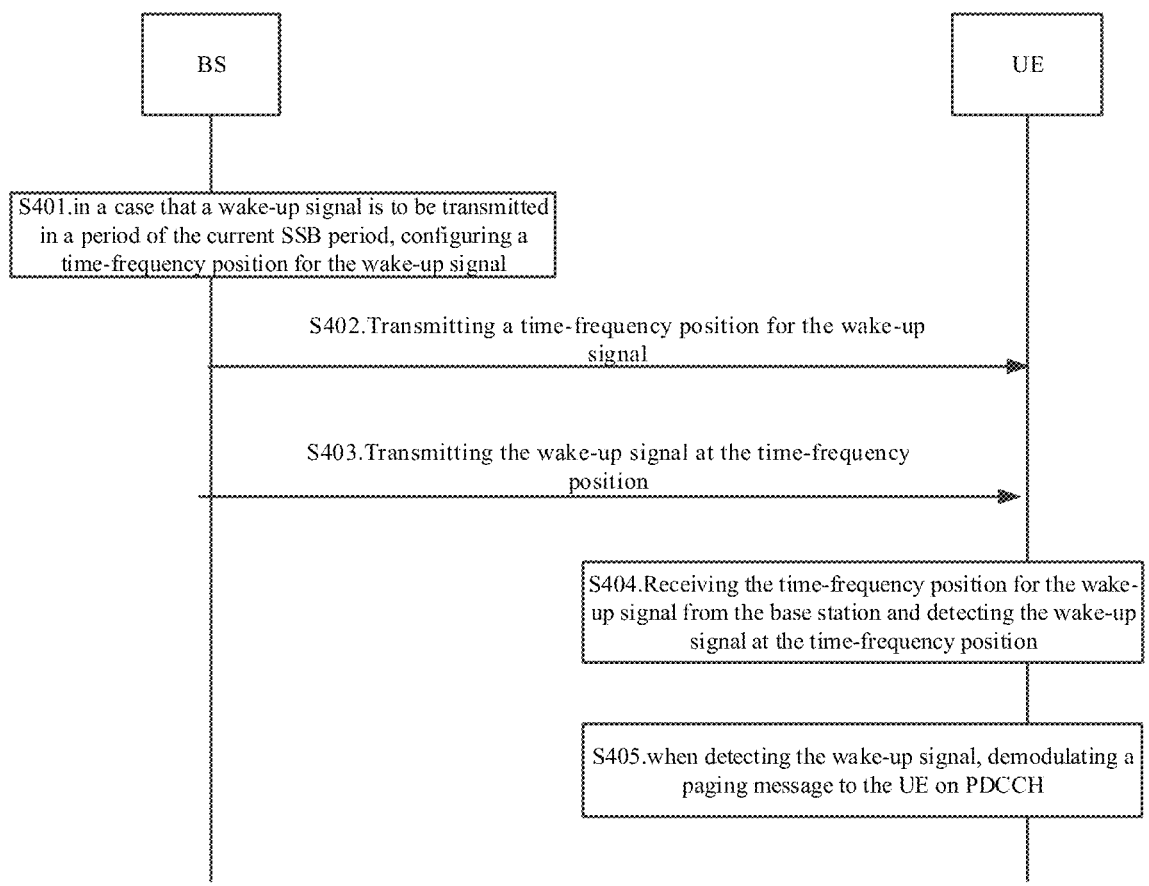
FIG. 4 is a signaling flowchart of a method of according to an exemplary embodiment of the present disclosure.

FIG. 4 is a signaling flow chart of a method of demodulating paging according to an exemplary embodiment of the present disclosure. This embodiment is described from the perspective of interaction between a base station and UE. As illustrated in FIG. 4, the paging demodulation method includes:

In step S401, in a case that a wake-up signal is to be transmitted by the base station in a period of the current SSB period, a time-frequency position is configured for the wake-up signal, so that a frequency-domain position for the wake-up signal is frequency division multiplexed with the current SSB, and a time-domain position for the wake-up signal is located in a time domain symbol range of the current SSB.

In step S402, the base station transmits the time-frequency position for the wake-up signal to the UE.

In step S403, the base station transmits a wake-up signal at the time-frequency position.

In step S404, the UE receives, from the base station, the time-frequency position for the wake-up signal, and detects a wake-up signal at the time-frequency position.

In step S405, in a case that the UE detects a wake-up signal, a paging message to the UE is demodulated on a PDCCH.

In the above-mentioned embodiment, through the interaction between the base station and the UE, the base station may transmit the wake-up signal at the configured time-frequency position for the wake-up signal, which enhances the transmission efficiency of the wake-up signal and effectively solves the problem of page loss caused by LBT. And meanwhile, the UE is enabled to detect the wake-up signal at the time-frequency position for the wake-up signal, and in a case that the wake-up signal is detected, the paging message to the UE is demodulated on the PDCCH, thereby reducing power consumption due to frequently demodulating paging messages on the PDCCH.

Figure 5:
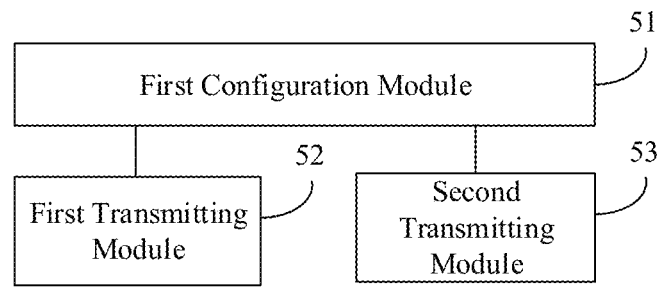
FIG. 5 is a block diagram illustrating a device for transmitting wake-up signal according to an exemplary embodiment of the present disclosure.

FIG. 5 is a block diagram illustrating a device for transmitting wake-up signal according to an exemplary embodiment of the present disclosure. The device may be provided in a base station. As illustrated in FIG. 5, the device includes: a first configuration module 51, a first transmitting module 52, and a second transmitting module 53.

The first configuration module 51 is configured to configure a time-frequency position for a wake-up signal in a case that the wake-up signal is to be transmitted in a period of a current synchronization signal block SSB, so that a frequency-domain position for the wake-up signal is frequency division multiplexed with the current SSB, and a time-domain position is located in a time domain symbol range of the current SSB.

SSB refers to a synchronization signal block (Synchronization Signal Block) or a physical broadcast channel block (PBCH Block).

In this embodiment, as illustrated in FIG. 2, the current SSB 21 can be frequency division multiplexed with the wake-up signal 22, or can be frequency division multiplexed with the wake-up signal 22 and other channel 23.

As the time domain position for the wake-up signal is located in the time-domain symbol range of the current SSB, a quantity of time-domain symbols of the wake-up signal is less than or equal to a quantity of time-domain symbols of the current SSB. In addition, optionally, some SSBs may not be multiplexed with the wake-up signal.

The first transmitting module 52 is configured to transmit, to user equipment (UE), the time-frequency position for the wake-up signal configured by the first configuration module 51.

The second transmitting module 53 is configured to transmit the wake-up signal at the time-frequency position configured by the first configuration module 51.

In the above embodiment, in a case that the wake-up signal is to be transmitted in the period of the current synchronization signal block (SSB), the time-frequency position for the wake-up signal is configured, and the time-frequency position for the wake-up signal is transmitted to the UE, and the wake-up signal is transmitted at the time-frequency position, thereby enhancing the transmission efficiency of the wake-up signal and effectively solving the problem of paging loss caused by LBT.

Figure 6:
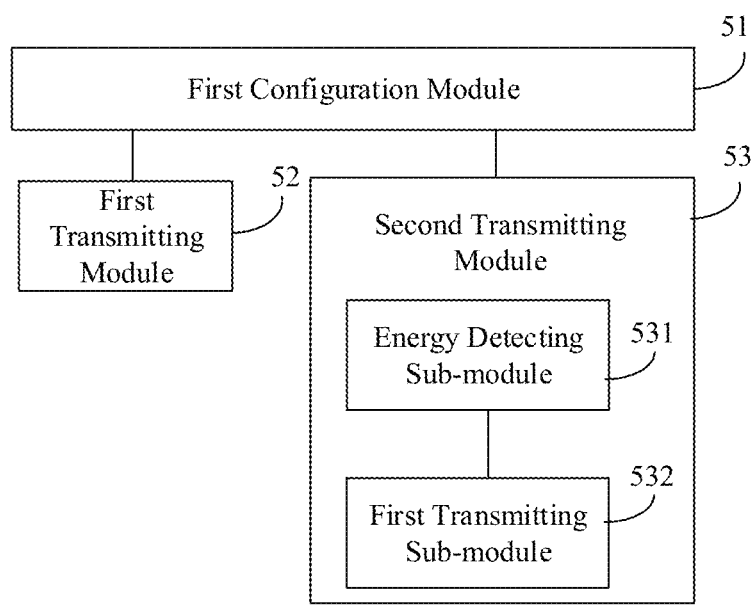
FIG. 6 is a block diagram illustrating a device for transmitting wake-up signal according to another exemplary embodiment of the present disclosure.

FIG. 6 is a block diagram illustrating another device for transmitting wake-up signal according to another exemplary embodiment. As illustrated in FIG. 6, on the basis of the embodiment illustrated in FIG. 5, the second transmitting module 53 may include: an energy detection sub-module 531 and a first transmitting sub-module 532.

The energy detection sub-module 531 is configured to perform, before transmitting the wake-up signal through a channel where the time-frequency position is located, energy detection on the channel for a preset time interval.

The first transmitting sub-module 532 is configured to transmit, in a case that the energy of the channel detected by the energy detection sub-module 531 is no more than a preset threshold, the wake-up signal at the time-frequency position.

In this embodiment, energy detection can be performed, before transmitting the wake-up signal through the channel where the time-frequency position is located, on the channel for a preset time interval. In a case that the energy of the channel is no more than the preset threshold, the wake-up signal is transmitted at the time-frequency position. The preset time interval is determined by an LBT algorithm.

In the above embodiment, the energy detection is performed, in a preset time interval before transmitting the wake-up signal through the channel where the time-frequency position is located, on the channel, and the wake-up signal is transmitted at the time-frequency location in a case that the energy of the channel is no more than the preset threshold, thereby achieving LBT before transmitting the wake-up signal.

Figure 7:
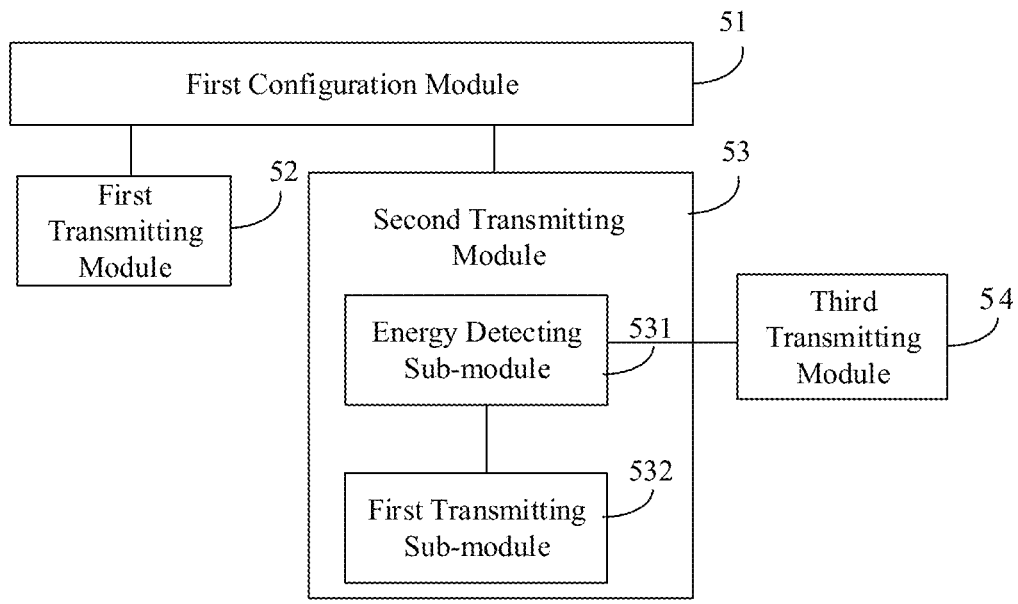
FIG. 7 is a block diagram illustrating a device for transmitting wake-up signal according to another exemplary embodiment.

FIG. 7 is a block diagram illustrating a device for transmitting wake-up signal according to another exemplary embodiment. As illustrated in FIG. 7, on the basis of the embodiment illustrated in FIG. 6, the device further includes: a third transmitting module 54.

The third transmitting module 54 is configured to transmit the wake-up signal at a pre-configured alternative position in a case that the energy of the channel detected by the energy detection sub-module 531 is greater than a preset threshold.

In the foregoing embodiment, in a case that the energy of the channel is greater than the preset threshold, the wake-up signal is transmitted at the alternative position that is pre-configured to improve success rate of transmitting the wake-up signal.

Figure 8:
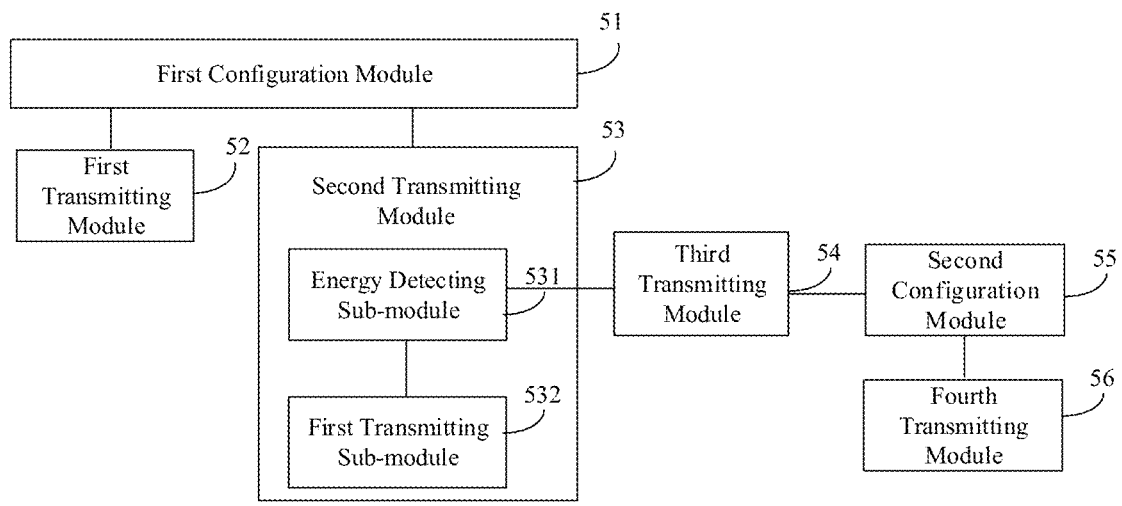
FIG. 8 is a block diagram illustrating a device for transmitting wake-up signal according to another exemplary embodiment of the present disclosure.

FIG. 8 is a block diagram illustrating a device for transmitting wake-up signal according to another exemplary embodiment of the present disclosure. As illustrated in FIG. 8, on the basis of the embodiment illustrated in FIG. 7, the device further includes: a second configuration module 55 and the fourth transmitting module 56.

The second configuration module 55 is configured to configure an alternative position for the wake-up signal.

The fourth transmitting module 56 is configured to transmit, to UE, the alternative position for the wake-up signal configured by the second configuration module.

In the above embodiment, by configuring an alternative position for the wake-up signal and transmitting the alternative position for the wake-up signal to the UE, which offers conditions for transmitting the wake-up signal at the alternative position subsequently.

Figure 9:
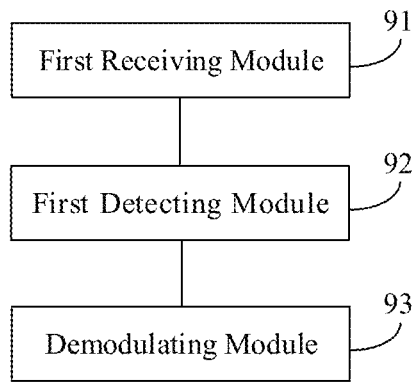
FIG. 9 is a block diagram illustrating a device for demodulating paging according to an exemplary embodiment of the present disclosure.

FIG. 9 is a block diagram illustrating a device for demodulating paging according to an exemplary embodiment of the present disclosure. The device is provided in UE. As illustrated in FIG. 9, the device includes: a first receiving module 91, a first detecting module 92, and a demodulating module 93.

The first receiving module 91 is configured to receive, from a base station, a time-frequency position for a wake-up signal, wherein a frequency-domain position for the wake-up signal is frequency division multiplexed with the current SSB, and a time-domain position for the wake-up signal is within a time-domain symbol range of the current SSB.

The first detecting module 92 is configured to detect the wake-up signal at the time-frequency position received by the first receiving module 91.

The demodulating module 93 is configured to demodulate a paging message to the UE on a physical downlink control channel (PDCCH) in a case that the first detection module 92 detects the wake-up signal.

In this embodiment, until that the wake-up signal is detected, paging messages are not demodulated on the PDCCH so as to save power.

In the above embodiment, the wake-up signal is detected at the received time-frequency position for the wake-up signal, and in a case that the wake-up signal is detected, the paging message to the UE is demodulated on the PDCCH, thereby reducing power consumption due to frequently demodulating paging messages on the PDCCH.

Figure 10:
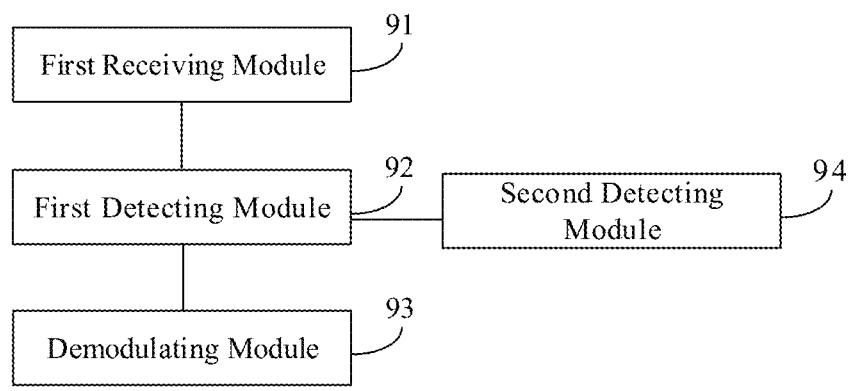
FIG. 10 is a block diagram illustrating a device for demodulating paging according to another exemplary embodiment of the present disclosure.

FIG. 10 is a block diagram illustrating a device for demodulating paging according to another exemplary embodiment of the present disclosure. As illustrated in FIG. 10, on the basis of the embodiment illustrated in FIG. 9, the device further includes: a second detecting module 94.

The second detecting module 94 is configured to detect, in a case that the first detecting module 92 fails to detect the wake-up signal at the time-frequency position, the wake-up signal at the alternative position for the wake-up signal.

In this embodiment, in a case that the wake-up signal is not detected at the time-frequency position, the wake-up signal can be detected at the alternative position for the wake-up signal.

In the above-mentioned embodiment, in a case that the wake-up signal is not detected at the time-frequency position, the wake-up signal is detected at the alternative position for the wake-up signal so as to improve success rate of detecting the wake-up signal.

Figure 11:
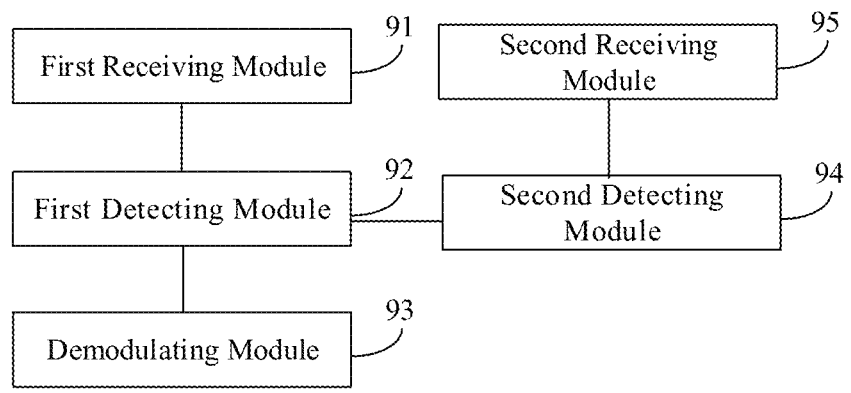
FIG. 11 is a block diagram illustrating a device for demodulating paging according to another exemplary embodiment of the present disclosure.

FIG. 11 is a block diagram illustrating a device for demodulating paging according to an exemplary embodiment of the present disclosure. As illustrated in FIG. 11, based on the embodiment illustrated in FIG. 10, the device further includes: a second receiving module 95.

The second receiving module 95 is configured to receive, from the base station, an alternative position for the wake-up signal.

In the foregoing embodiment of the present disclosure, receiving, from the base station, an alternative position for the wake-up signal, offers conditions for subsequently detecting the wake-up signal at the alternative position for the wake-up signal.

Figure 12:
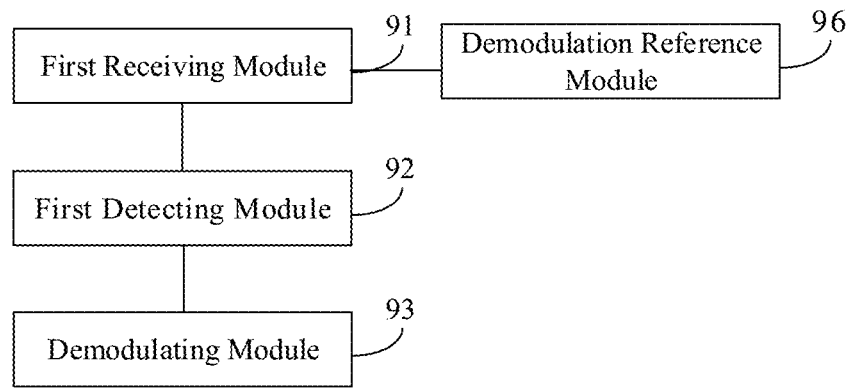
FIG. 12 is a block diagram illustrating a device for demodulating paging according to another exemplary embodiment of the present disclosure.

FIG. 12 is a block diagram illustrating a device for demodulating paging according to another exemplary embodiment. As illustrated in FIG. 12, on the basis of the embodiment illustrated in FIG. 9, the device further includes: a demodulation reference module 96.

The demodulation reference module 96 is configured to take, in a case that other information which is carried by other channel multiplexed with the current SSB is demodulated at a time-frequency position within a preset distance range from the time-frequency position received by the first receiving module 91, the wake-up signal as a reference signal for demodulating the other information.

Optionally, as the current SSB may be multiplexed with other channels, in a case that the current SSB is multiplexed with other channels, the wake-up signal can serve as a reference signal for demodulating other multiplexed channels. That is, in a case that other information which is carried by other channels multiplexed with the current SSB is demodulated at a time-frequency position within a preset distance range from the time-frequency position, the wake-up signal can be taken as a reference signal for demodulating the other information.

In the foregoing embodiment, in a case that other information which is carried by other channels multiplexed with the current SSB is demodulated at a time-frequency position within a preset distance range from the time-frequency position, the wake-up signal can be taken as a reference signal for demodulating the other information, thereby demodulating other information through the wake-up signal.

Figure 13:
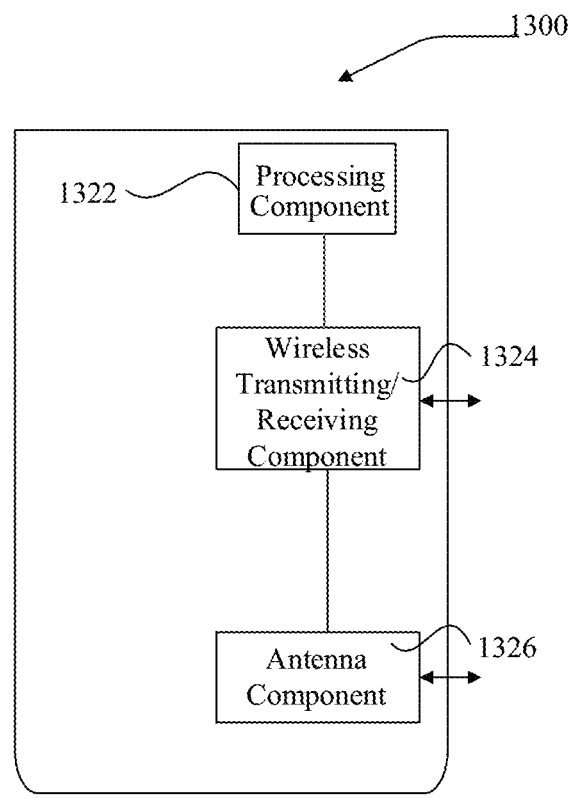
FIG. 13 is a block diagram illustrating an apparatus applicable to transmit wake-up signal according to an exemplary embodiment of the present disclosure.

FIG. 13 is a block diagram illustrating an apparatus for transmitting wake-up signal according to an exemplary embodiment of the present disclosure. The apparatus 1300 may be provided as a base station. Please refer to FIG. 13, the apparatus 1300 includes a processing component 1322, a wireless transmitting/receiving component 1324, an antenna component 1326, and a signal processing part specific to a wireless interface. The processing component 1322 may further include one or more processors.

One processor of the processing component 1322 may be configured to:

configure a time-frequency position for the wake-up signal in a case that a wake-up signal is to be transmitted in a period of a current synchronization signal block SSB, so that a frequency-domain position for the wake-up signal is multiplexed with the current SSB and a time-domain position for the wake-up signal is located in a time domain symbol range of the current SSB;

transmit, to user equipment (UE), the time-frequency position for the wake-up signal; and transmit the wake-up signal at the time-frequency position.

In an exemplary embodiment, there is further provided a non-transitory computer-readable storage medium including instructions, which can be executed by the processing component 1322 of the apparatus 1300 to complete the aforementioned method of transmitting wake-up signal. For example, the non-transitory computer-readable storage medium may be a ROM, a random access memory (RAM), a CD-ROM, a magnetic tape, a floppy disk, an optical data storage device, etc.

Figure 14:
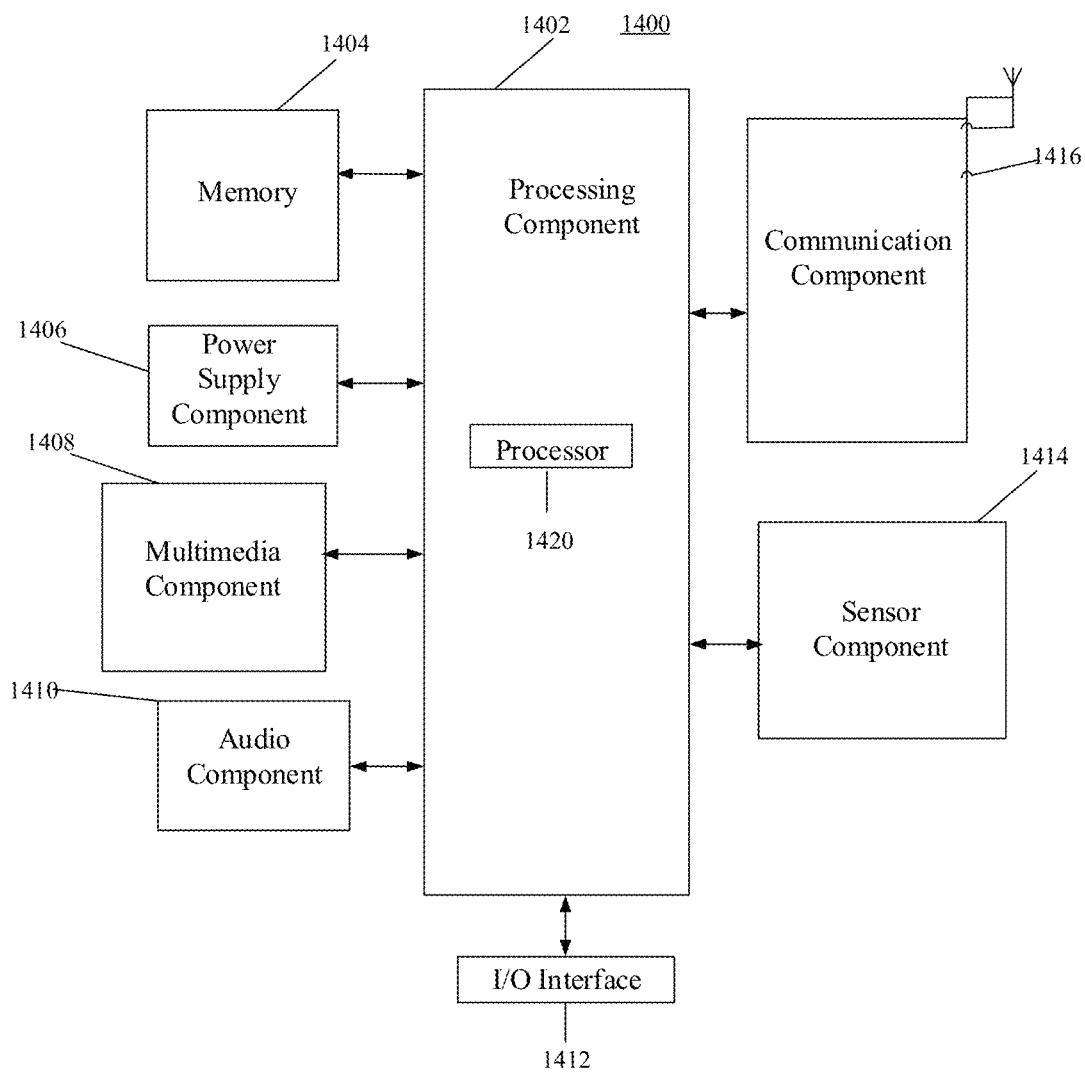
FIG. 14 is a block diagram illustrating an apparatus applicable to demodulate paging according to an exemplary embodiment of the present disclosure.

FIG. 14 is a block diagram illustrating an apparatus applicable to paging demodulation according to an exemplary embodiment of the present disclosure. For example, the apparatus 1400 may be a mobile phone, a computer, a digital broadcasting terminal, a messaging device, a game console, a tablet device, a medical device, a fitness device, a personal digital assistant, and other user equipment.

Referring to FIG. 14, the apparatus 1400 may include one or more of the following components: a processing component 1402, memory 1404, a power supply component 1406, a multimedia component 1408, an audio component 1410, an input/output (I/O) interface 1412, a sensor component 1414, and a communication component 1416.

The processing component 1402 generally controls the overall operations of the apparatus 1400, such as operations associated with display, telephone calls, data communications, camera operations, and recording operations. The processing element 1402 may include one or more processors 1420 to execute instructions to complete all or part of the steps of the foregoing method. In addition, the processing component 1402 may include one or more modules to facilitate interaction between the processing component 1402 and other components. For example, the processing component 1402 may include a multimedia module to facilitate the interaction between the multimedia component 1408 and the processing component 1402.

One of the processors 1420 in the processing component 1402 may be configured to:

receive, from a base station, a time-frequency position for a wake-up signal, wherein a frequency-domain position for the wake-up signal is frequency division multiplexed with a current SSB, and a time-domain position for the wake-up signal is within a time-domain symbol range of the current SSB;

detect the wake-up signal at the time-frequency position; and demodulate, in a case that the wake-up signal is detected, a paging message to UE on the physical downlink control channel (PDCCH).

The memory 1404 is configured to store various types of data to support the operations of the apparatus 1400. Examples of these data include instructions for any application or method operated on the apparatus 1400, contact data, phone book data, messages, pictures, videos, and etc. The memory 1404 can be implemented by any type of volatile or non-volatile storage devices or their combination, such as a static random access memory (SRAM), an electrically erasable programmable read-only memory (EEPROM), an erasable Programmable read-only memory (EPROM), a programmable read-only memory (PROM), read-only memory (ROM), a magnetic memory, a flash memory, a magnetic disk or an optical disk.

The power supply component 1406 provides power for various components of the apparatus 1400. The power supply component 1406 may include a power management system, one or more power supplies, and other components associated with generating, managing, and distributing power for the apparatus 1400.

The multimedia component 1408 includes a screen that provides an output interface between the device 1400 and the user. In some embodiments of the present disclosure, the screen may include a liquid crystal display (LCD) and a touch panel (TP). In a case that the screen includes a touch panel, the screen may be implemented as a touch screen to receive input signals from the user. The touch panel includes one or more touch sensors to sense touch, sliding, and gestures on the touch panel. The touch sensor cannot only sense the boundary of the touch or slide action, but also detect the duration and pressure associated with the touch or slide operation. In some embodiments of the present disclosure, the multimedia component 1408 includes a front camera and/or a rear camera. In a case that the apparatus 1400 is in an operation mode, such as a shooting mode or a video mode, the front camera and/or the rear camera can receive external multimedia data. Each of the front camera and the rear camera can be a fixed optical lens system or have focal length and optical zooming capabilities.

The audio component 1410 is configured to output and/or input audio signals. For example, the audio component 1410 includes a microphone (MIC). In a case that the apparatus 1400 is in an operation mode, such as a call mode, a recording mode, and a voice recognition mode, the microphone is configured to receive external audio signals. The received audio signal may be further stored in the memory 1404 or transmitted via the communication component 1416. In some embodiments of the present disclosure, the audio component 1410 further includes a speaker for outputting audio signals.

The I/O interface 1412 provides an interface between the processing component 1402 and a peripheral interface module. The peripheral interface module may be a keyboard, a click wheel, a button, and the like. The button may include but are not limited to: a home button, a volume button, a start button, and a lock button.

The sensor component 1414 includes one or more sensors for providing the device 1400 with various aspects of state assessment. For example, the sensor apparatus 1414 can detect the ON/OFF state of the apparatus 1400 and the relative positioning of components, such as the relative position of the display and keypad of the apparatus 1400. The sensor component 1414 can further detect change in position of the device 1400 or a component of the apparatus 1400, presence or absence of contact with the apparatus 1400, the orientation or acceleration/deceleration of the apparatus 1400 and change in temperature of the apparatus 1400. The sensor assembly 1414 may include a proximity sensor configured to detect the presence of nearby objects in case of no physical contact. The sensor component 1414 may further include a light sensor, such as a CMOS or CCD image sensor, for use in imaging applications. In some embodiments of the present disclosure, the sensor component 1414 may further include an acceleration sensor, a gyroscope sensor, a magnetic sensor, a pressure sensor or a temperature sensor.

The communication component 1416 is configured to facilitate wired or wireless communication between the apparatus 1400 and other devices. The apparatus 1400 can access a wireless network based on a communication standard, such as WiFi, 2G, or 3G, or a combination thereof. In an exemplary embodiment of the present disclosure, the communication component 1416 receives a broadcast signal or broadcast related information from an external broadcast management system via a broadcast channel. In an exemplary embodiment of the present disclosure, the communication component 1416 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 1400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, so as to perform the above methods.

In an exemplary embodiment, there is further provided a non-transitory computer-readable storage medium including instructions, such as memory 1404 including instructions, which may be executed by the processor 1420 of the apparatus 1400 to complete the foregoing method. For example, the non-transitory computer-readable storage medium may be a ROM, a random access memory (RAM), a CD-ROM, a magnetic tape, a floppy disk, an optical data storage device, and etc.

For the device embodiment, since it substantially corresponds to the method embodiment, the relevant part can be referred to the part of the description of the method embodiment. The device embodiments described above are merely illustrative. The units described as separate components may or may not be physically separated, and the components displayed as a unit may or may not be physical units, that is, they may be located at one place, or it can be distributed on multiple units over network. Some or all of the modules may be selected according to actual requirements to achieve the objectives of the solutions of the embodiments. One of ordinary skill in the art can understand and implement it without any creative work.

It should be noted that in the specification, relational terms such as first and second are only used to distinguish one entity or operation from another entity or operation, and do not necessarily suggest or imply that there are any accrual relationship or order therebetween. The terms "include", "comprise", or any other variants thereof are intended to cover non-exclusive inclusion, so that a process, method, article or device including a series of elements includes not only those elements listed, but also other elements that are not explicitly listed, or further include elements inherent to such processes, methods, articles, or equipment. If there are no more restrictions, the element defined by the sentence "including a . . . " does not exclude the existence of other same elements in the process, method, article, or equipment including the element.

After considering the specification and practicing the disclosure disclosed herein, one of ordinary skill in the art will easily think of other embodiments of the present disclosure. This disclosure is intended to cover any variations, usage, or adaptive changes of the present disclosure, which follow the general principles of the present disclosure and include common knowledge or conventional technical means in the technical field not disclosed in the present disclosure. The description and the embodiments are illustrative only, and the true scope and spirit of the present disclosure are set forth by the appended claims.

It should be understood that the present disclosure is not limited to the exact structure that has been described above and illustrated in the drawings, and various modifications and changes can be made without departing from its scope. The scope of the present disclosure is limited only by the appended claims.

What is claimed is:

1. A method of transmitting a wake-up signal, performed by a base station, the method comprising:
    in response to determining that the wake-up signal is to be transmitted, configuring a time-frequency position for the wake-up signal, wherein the time-frequency position is configured such that a frequency-domain position for the wake-up signal is frequency division multiplexed with a to-be-transmitted synchronization signal block (SSB) and a time-domain position for the wake-up signal is located in a time domain symbol range of the to-be-transmitted SSB, a quantity of time-domain symbols of the wake-up signal is less than or equal to a quantity of time-domain symbols of the to-be-transmitted SSB;
    transmitting, to user equipment (UE), the time-frequency position for the wake-up signal; and
    transmitting the wake-up signal at the time-frequency position.

2. The method according to claim 1, wherein transmitting the wake-up signal at the time-frequency position comprises:
    performing, before transmitting the wake-up signal through a channel where the time-frequency position is located, energy detection on the channel for a preset time interval; and
    transmitting, in a case that energy of the channel is no more than a preset threshold, the wake-up signal at the time-frequency position.

3. The method according to claim 2, further comprising:
    transmitting, in a case that the energy of the channel is greater than the preset threshold, the wake-up signal at a pre-configured alternative position.

4. The method according to claim 3, further comprising:
    configuring the alternative position for the wake-up signal; and
    transmitting, to the UE, the alternative position for the wake-up signal.

5. A method of demodulating paging, performed by user equipment (UE), the method comprising:
    receiving, from a base station, a time-frequency position for a wake-up signal, wherein the time-frequency position is configured such that a frequency-domain position for the wake-up signal is frequency division multiplexed with a to-be-transmitted synchronization signal block (SSB) and a time-domain position for the wake-up signal is located in a time-domain symbol range of the to-be-transmitted SSB, a quantity of time-domain symbols of the wake-up signal is less than or equal to a quantity of time-domain symbols of the to-be-transmitted SSB;

detecting the wake-up signal at the time-frequency position; and demodulating, in a case that the wake-up signal is detected, a paging message to the UE on a physical downlink control channel (PDCCH).

6. The method according to claim 5, further comprising:
detecting, in a case that the wake-up signal is not detected at the time-frequency position for a preset time length, the wake-up signal at an alternative position for the wake-up signal.

7. The method according to claim 6, further comprising:
receiving, from the base station, the alternative position for the wake-up signal.

8. The method according to claim 5, further comprising:
taking, in a case that that other information which is carried by other channel multiplexed with the current SSB is demodulated at a time-frequency position within a preset distance range from the time-frequency position, the wake-up signal as a reference signal to demodulate the other information.

9. A base station, comprising:
a processor;
memory, configured to store instructions executable by the processor;
wherein, the processor is configured to execute the instructions to perform operations of the method according to claim 1.

10. The base station according to claim 9, wherein in a case that the processor is configured to transmit the wake-up signal at the time-frequency position, the processor is further configured to:
perform, prior to transmitting the wake-up signal through a channel where the time-frequency position is located, energy detection on the channel for a preset time interval; and
transmit, in a case that energy of the channel is no more than a preset threshold, the wake-up signal at the time-frequency position.

11. The base station according to claim 10, the processor is further configured to:
transmit, in a case that the energy of the channel is greater than the preset threshold, the wake-up signal at an alternative position that is pre-configured.

12. The base station according to claim 11, the processor is further configured to:
configure the alternative position for the wake-up signal; and
transmit, to the UE, the alternative position for the wake-up signal.

13. User equipment (UE), comprising:
a processor; and
memory, configured to store instructions executable by the processor;
wherein, the processor is configured to execute the instructions to perform operations of the method according to claim 5.

14. The UE according to claim 13, wherein the processor is further configured to:
detect, in a case that the wake-up signal is not detected at the time-frequency position, the wake-up signal at an alternative position for the wake-up signal.

15. The UE according to claim 13, wherein the processor is further configured to:
receive, from the base station, the alternative position for the wake-up signal.

16. The UE according to claim 13, wherein the processor is further configured to:
take, in a case that other information which is carried by other channel multiplexed with the current SSB is demodulated at a time-frequency position within a preset distance range from the time-frequency position, the wake-up signal as a reference signal to demodulate the other information.

17. A non-transitory computer-readable storage medium having computer instructions stored thereon for execution by a processor to implement steps of the method of transmitting a wake-up signal according to claim 1.

18. A non-transitory computer-readable storage medium having computer instructions stored thereon for execution by a processor to implement steps of the method of demodulating paging according to claim 5.

19. A communication system comprising the base station of claim 9, further comprising the UE; wherein the wake-up signal is transmitted at the time-frequency position to thereby enhance transmission efficiency of the wake-up signal and reduce paging loss caused by listen before talk (LBT).

20. The communication system of claim 19, wherein the UE is configured to:
detect the wake-up signal at the received time-frequency position for the wake-up signal;
in a case that the wake-up signal is detected, demodulate the paging message to the UE on a physical downlink control channel (PDCCH), to thereby reduce power consumption due to frequently demodulating paging messages on the PDCCH.

* * * * *